United States Patent
Kanbori et al.

(10) Patent No.: US 8,596,877 B2
(45) Date of Patent: Dec. 3, 2013

(54) TAPERED ROLLER BEARING

(75) Inventors: Yasuhiro Kanbori, Iwata (JP); Takashi Ueno, Iwata (JP)

(73) Assignee: NTN Corporation, Osaka (JP)

( * ) Notice: Subject to any disclaimer, the term of this patent is extended or adjusted under 35 U.S.C. 154(b) by 646 days.

(21) Appl. No.: 12/742,451

(22) PCT Filed: Nov. 7, 2008

(86) PCT No.: PCT/JP2008/070284
§ 371 (c)(1),
(2), (4) Date: May 12, 2010

(87) PCT Pub. No.: WO2009/063802
PCT Pub. Date: May 22, 2009

(65) Prior Publication Data
US 2010/0322548 A1    Dec. 23, 2010

(30) Foreign Application Priority Data

Nov. 12, 2007  (JP) ................. 2007-293105
Feb. 27, 2008  (JP) ................. 2008-046109

(51) Int. Cl.
*F16C 33/58*  (2006.01)
*F16C 33/48*  (2006.01)
*F16C 33/56*  (2006.01)

(52) U.S. Cl.
USPC ............................ 384/571; 384/572; 384/576

(58) Field of Classification Search
USPC .................. 384/560, 561, 564, 571, 572, 576
See application file for complete search history.

(56) References Cited

U.S. PATENT DOCUMENTS 1,512,006 A * 10/1924 Hagenlocher ................. 384/571
2,435,839 A *  2/1948 McNicoll ...................... 384/575
3,940,193 A *  2/1976 Molloy ......................... 384/580

(Continued)

FOREIGN PATENT DOCUMENTS

EP    1 770 294    4/2007
EP    1 847 727    10/2007

(Continued)

OTHER PUBLICATIONS

International Search Report issued Dec. 9, 2008 in International (PCT) Application No. PCT/JP2008/070284.

(Continued)

*Primary Examiner* — Thomas R Hannon
*Assistant Examiner* — Kashif Mohammed
(74) *Attorney, Agent, or Firm* — Wenderoth, Lind & Ponack, L.L.P.

(57) ABSTRACT

A tapered roller bearing includes a retainer with a protrusion that is axially brought into engagement with a flange of the inner race. The inner race has a flange for guiding the tapered rollers only at the large-diameter end of the raceway. The retainer has on the large-diameter side thereof a protrusion radially inwardly extending and axially engaging the flange of the inner race. The flange of the inner race is formed with a circumferentially continuous cutout groove having a smoothly curved concave surface through which the radially outer surface and the outer end surface of the flange are connected to each other. The protrusion of the retainer has its inner side at its radially inner end portion in engagement with the cutout groove, allowing size reduction and load bearing capacity increase for the tapered roller bearing, while preventing stress concentration on the flange of the inner race.

9 Claims, 10 Drawing Sheets

(56) References Cited

U.S. PATENT DOCUMENTS

| | | | |
|---|---|---|---|
| 4,523,862 A * | 6/1985 | Yasui et al. | 384/564 |
| 4,699,529 A * | 10/1987 | Scholl et al. | 384/560 |
| 4,707,152 A | 11/1987 | Neese | |
| 4,923,313 A * | 5/1990 | Bergling | 384/571 |
| 5,009,525 A | 4/1991 | Brockmüller et al. | |
| 6,315,459 B1 * | 11/2001 | Takano et al. | 384/572 |
| 6,386,764 B1 * | 5/2002 | Moore et al. | 384/448 |
| 6,659,650 B2 * | 12/2003 | Joki et al. | 384/572 |
| 2007/0297705 A1 | 12/2007 | Hosoya et al. | |
| 2009/0003745 A1 * | 1/2009 | Tsujimoto | 384/450 |
| 2011/0075959 A1 * | 3/2011 | Koizumi | 384/571 |

FOREIGN PATENT DOCUMENTS

| | | |
|---|---|---|
| JP | 58-165324 | 11/1983 |
| JP | 9-236131 | 9/1997 |
| JP | 2002-054638 | 2/2002 |
| JP | 2003-028168 | 1/2003 |
| JP | 2004-169761 | 6/2004 |
| JP | 2005-098412 | 4/2005 |
| JP | 2006-105304 | 4/2006 |
| JP | 2007-132469 | 5/2007 |
| JP | 2007-177843 | 7/2007 |
| WO | 2006/080527 | 8/2006 |
| WO | 2007/046263 | 4/2007 |

OTHER PUBLICATIONS

European Search Report issued Dec. 8, 2011 in counterpart European Application No. 08850203.4.

* cited by examiner

TAPERED ROLLER BEARING

TECHNICAL FIELD

This invention relates to a tapered roller bearing which is compact but has a large load bearing capacity.

BACKGROUND ART

A tapered roller bearing comprises inner and outer races having conical raceways, respectively, and tapered rollers disposed between the inner and outer races and received in pockets of a conical tubular retainer. Such a tapered roller bearing ordinarily includes a large flange formed on the inner race at the large-diameter end of its raceway for guiding the tapered rollers, and a small flange formed on the inner race at the small-diameter end of its raceway to restrict the axial position of the tapered rollers, thereby preventing separation of the tapered rollers from the inner race with the tapered rollers received in the respective pockets of the retainer during handling of the bearing.

Transmissions in today's vehicles have a larger number of steps for fuel economy, and their engine rooms are smaller to increase the passenger interior space. As a result, it is required to reduce the size of tapered roller bearings supporting power transmission shafts of vehicle differentials and transmissions because their available installation spaces are reduced. Simultaneously, to cope with increased output of vehicle engines, bearings with large load bearing capacity are required.

Some tapered roller bearings have a (large) flange only at the large-diameter end of the inner raceway to guide the tapered rollers while omitting the small flange. Instead, a radially inwardly extending protrusion is provided at the large-diameter end that axially engages the flange of the inner race, thereby indirectly restricting the axial position of the tapered rollers through the retainer so as to prevent separation of the tapered rollers from the inner race (see e.g. JP Utility Model Publication 58-165324 and JP Patent Publication 2002-54638A). In the invention disclosed in JP Utility Model Publication 58-165324, in order to easily form the inner race and to improve the yield of material, an engaging portion of the flange of the inner race for engaging a protrusion of a resin retainer is formed on a circumferential step provided on the corner between the outer end of the outer periphery of the flange and its end surface, on a circumferential groove formed in the outer periphery of the flange, or on a side surface of the flange. In the invention disclosed in JP Patent Publication 2002-54638A, in order to increase load bearing capacity of the bearing by increasing the width of the raceways and the length of the tapered rollers, an engaging portion of the flange of the inner race for engaging a protrusion of a retainer made of metal is formed on a circumferential step provided on the corner between the outer end of the outer periphery of the flange and its end surface.

In the arrangement in which, as in the tapered roller bearings disclosed in JP Utility Model Publication 58-165324 and JP Patent Publication 2002-54638A, instead of the small flange, a protrusion formed on the retainer is brought into engagement with the circumferential step or circumferential groove formed on the flange, and stress tends to concentrate on the corner of the circumferential step or groove. Thus, the strength of the retainer tends to be insufficient relative to thrust loads applied from the large end surfaces of the tapered rollers to the flange. In the arrangement in which the protrusion of the retainer is brought into engagement with the side surface of the flange, no stress concentration occurs. But since the protrusion of the retainer protrudes from the side surface of the flange, it is difficult to reduce the size of the bearing.

In the arrangement in which, as disclosed in JP Patent Publication 2002-54638A, the retainer having the protrusion is made of a metal, a bending step is necessary to form the protrusion, which pushes up the manufacturing cost. Also, the metallic retainer may produce metal abrasion dust which could deteriorate lubricating properties of the lubricating oil. Thus, resin retainers are becoming popular today.

When forming conventional retainers for tapered roller bearings from resin, resin is injected into a cavity defined by two axially separable molds 81 and 82 shown in FIG. 12. The two molds 81 and 82 are slid in the axial direction of the retainer 83 to be formed toward and away from each other.

In forming the tapered roller bearing having such a protrusion using the above-mentioned molds, in order to release the molds 81 and 82 after abutting them together as shown in FIG. 13, the inner diameter D of the radially inner end of the protrusion 83a at the large-diameter end of the retainer 83 has to be larger than the outer diameter D1 of the small-diameter annular portion 83b of the retainer 83. The outer diameter D1 of the small-diameter annular portion 83b is determined by the inclination angle of the conical tubular portion of the retainer, which is an intermediate value between the inclination angles of the raceways of the inner and outer races, and by the radial deviation of the conical tubular portion of the retainer from the pitch circle of the tapered rollers. In order to prevent separation of the tapered rollers from the inner race, the conical tubular portion of the retainer has to be radially outwardly deviated from the pitch circle of the tapered rollers. Thus, in order for the inner diameter D of the radially inner end of the protrusion 83a to be larger than the outer diameter D1 of the small-diameter annular portion 83b, it is necessary to reduce the radial dimension of the protrusion 83a and unnecessarily increase the radial dimension of the large end of the inner race that is brought into engagement with the protrusion 83a. Thus, the design of the bearing is restricted.

SUMMARY OF THE INVENTION

An object of the present invention is to provide a tapered roller bearing of the type having a protrusion on the retainer that is axially brought into engagement with the flange of the inner race, wherein no stress concentration occurs on the flange of the inner race, which guides the tapered rollers and which is small and has a large load bearing capacity.

Another object is to provide a method of manufacturing a retainer for a tapered roller bearing by injection molding of resin without design restriction of the bearing.

In order to achieve this object, the present invention provides a tapered roller bearing comprising an inner race and an outer race having conical raceways, respectively, tapered rollers disposed between the inner and outer races, and a conical tubular retainer having pockets in which the tapered rollers are retained, respectively, the inner race having a flange for guiding the tapered rollers only at the large-diameter end of the raceway, the retainer having on the large-diameter side thereof a protrusion radially inwardly extending and axially engaging the flange of the inner race, wherein the flange of the inner race is formed with a circumferentially continuous cutout groove having a smoothly curved concave surface through which the radially outer surface and the outer end surface of the flange are connected to each other, and wherein the protrusion of the retainer has its inner side at its radially inner end portion in engagement with the cutout groove.

By forming in the flange of the inner race a circumferentially continuous cutout groove having a smoothly curved concave surface through which the radially outer surface and the outer end surface of the inner race are connected to each other, and bringing the inner side of the radially inner end portion of the flange of the protrusion of the retainer into engagement with this cutout groove, it is possible to reduce the size of the bearing and increase its load bearing capacity, while preventing stress concentration on the flange of the inner race, which guide the tapered rollers.

The concave surface may comprise either a single arcuate surface or a plurality of arcuate surfaces.

The inner side of the protrusion of the retainer at its radially end portion, which is engaged with the concave surface of the cutout groove, may be a convex arcuate surface.

Preferably, the convex arcuate surface has a radius of curvature equal to or smaller than the radius of curvature of the concave surface of the cutout groove.

Preferably, the small-diameter end surface of the retainer and the outermost end of the small end surface of each tapered roller are located axially inwardly of the small-diameter end surface of the inner race. With this arrangement, it is possible to compactly design a double row tapered roller bearing of which two inner races are arranged such that the small-diameter end surfaces of their raceways face each other.

The retainer is preferably made of polyphenylene sulfide resin (PPS). PPS, which is a super-engineering plastic, has a molecular structure in which phenyl groups (benzene rings) and phosphor atoms are alternately repeated, is crystalline, can be used continuously at 200-220° C., has an excellent deflection temperature under high load (1.82 MPa) of 260° C. or over, and is high in tensile strength and bending strength. Also, its shrinkage rate is small, i.e. 0.3 to 0.5%, so that its dimensional stability is high. Further, PPS is high in flame retardancy and chemical resistance, is lightweight because it is a resin, and has self-lubricity, so that it is possible to reduce the sliding resistance of the protrusion of the retainer against the cutout groove of the flange. PPS can be roughly classified into three types, i.e. cross-linked type, straight-chain type and semi-cross-linked type. Any of these types can be used in this invention. The cross-linked type is a high molecular weight polymer formed by cross-linking low molecular weight polymer, and is brittle, so that it is often reinforced with glass fiber. The straight-chain type is a polymer of which the molecular weight is increased without a cross-linking step during polymerization, and is high in toughness. The semi-cross-linked type has properties of both the cross-linked type and the straight-chain type.

By adding not more than 10% by mass of reinforcing material to the polyphenylene sulfide resin forming the retainer, it is possible to further increase the strength of the protrusion of the retainer. The content of the reinforcing material is determined to be not more than 10% by mass, because if the content of the reinforcing material is more than 10% by mass, the slide resistance of the protrusion increases when the retainer is mounted, and also the toughness of the protrusion tends to decrease, thus increasing the possibility of breakage of the retainer. Reinforcing materials usable in the present invention include fibrous reinforcing materials such as carbon fiber and glass fiber, and fine fibrous reinforcing materials such as potassium titanate whiskers.

Preferably, the tapered roller bearing according to the present invention has a roller coefficient $\gamma$ exceeding 0.94. With this arrangement, it is possible to reduce the maximum surface pressure of the raceways and increase the load bearing capacity if the bearing size is unchanged. The roller coefficient $\gamma$ is defined by the following equation. Ordinary tapered roller bearings have a roller coefficient $\gamma$ of 0.94 or under.

$$\gamma = (Z \cdot DA)/(\pi \cdot PCD)$$

where Z is the number of rollers; DA is an average diameter of the rollers; and PCD is the pitch circle diameter of the rollers.

Thus, increasing the roller coefficient $\gamma$ means to move the pitch circle of the retainer closer to outer race, thus increasing the number of rollers while keeping sufficient distances between the adjacent pockets, which are equal to the widths of the bridges. As a result, it is possible to reduce the maximum surface pressure of the raceways.

The pockets of the retainer preferably have a window angle of 55° or over and 80° or under. The window angle of the pockets is the angle formed between the guide surfaces of the bridges abutting the outer periphery of one roller. This window angle is determined to be 55° or over in order to ensure suitable contact with the rollers. The window angle is determined to be 80° or under because if this angle is over 80°, the rollers tend to be radially pushed so hard that the rollers may not be rolled smoothly even though the retainer is made of a resin having self-lubricity. Ordinary retainers have a window angle of 25 to 50°

The above-described retainers can be advantageously used to support a power transmission shaft of a vehicle.

In order to achieve the second object, the present invention provides a method of manufacturing by resin injection molding a retainer for a tapered roller bearing wherein the retainer has a conical tubular portion formed with a plurality of circumferentially spaced pockets for receiving tapered rollers, respectively, and having a radially inwardly extending protrusion formed on the large-diameter side of the conical tubular portion and axially engaged by the flange of the inner race, wherein the resin injection molding is carried out using a mold assembly comprising a radially outer mold defining the radially outer portion of a cavity for forming the conical tubular portion having the protrusion, a radially inner mold for defining the radially inner portion of the cavity, and pocket forming cores for closing portions of the cavity corresponding to the pockets, and wherein the pocket forming cores can be radially moved into and out of the cavity.

That is, as a mold assembly for resin injection molding, by forming one comprising a radially outer mold defining the radially outer portion of a cavity for forming the conical tubular portion having the protrusion, a radially inner mold for defining the radially inner portion of the cavity, and pocket forming cores for closing portions of the cavity corresponding to the pockets, and wherein the pocket forming cores can be radially moved into and out of the cavity, it is possible to eliminate the necessity of axially sliding the radially outer and inner molds into abutment with each other, which makes it possible to manufacture by resin injection molding the retainer having the protrusion without design restriction of the bearing.

The pocket forming cores may be configured to be moved into and out of the cavity from and toward the radially inner position in the direction perpendicular to the axial inclination angle of the cavity for forming the conical tubular portion.

The pocket forming cores may also be configured to be moved into and out of the cavity from and toward the radially outer position in the direction perpendicular to the axial inclination angle of the cavity for forming the conical tubular portion.

The pocket forming cores may also be configured to be moved into and out of the cavity from and toward the radially inner position in the direction perpendicular to the axial direction.

The pocket forming cores may also be configured to be moved into and out of the cavity from and toward the radially outer position in the direction perpendicular to the axial direction.

With the tapered roller bearing according to the present invention, since the flange of the inner race is formed with a circumferentially continuous cutout groove having a smoothly curved concave surface through which the radially outer surface and the outer end surface of the flange are connected to each other, and the protrusion of the retainer has its inner side at its radially inner end portion in engagement with the cutout groove, it is possible to reduce the size of the bearing and increase its load bearing capacity, while preventing stress concentration on the flange of the inner race for guiding the tapered rollers.

In the method of manufacturing a retainer for a tapered roller bearing for achieving the second object, since the mold assembly for resin injection molding comprises a radially outer mold defining the radially outer portion of a cavity for forming the conical tubular portion having the protrusion, a radially inner mold for defining the radially inner portion of the cavity, and pocket forming cores for closing portions of the cavity corresponding to the pockets, and wherein the pocket forming cores can be radially moved into and out of the cavity, it is possible to eliminate the necessity of axially sliding the radially outer and inner molds into abutment with each other, which makes it possible to manufacture by resin injection molding the retainer having the protrusion without design restriction of the bearing.

DETAILED DESCRIPTION OF THE INVENTION

Figure 1:
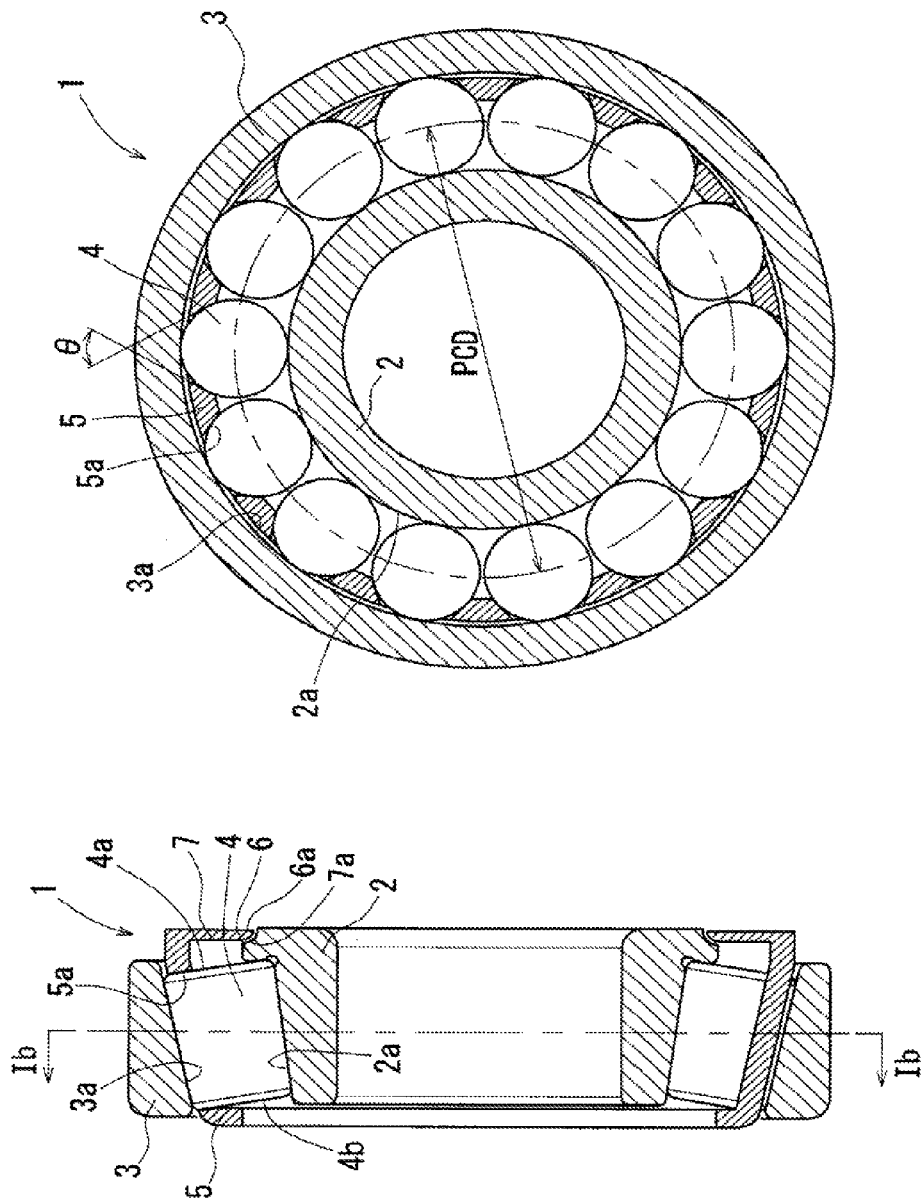
FIG. 1(a) is a vertical sectional view of a tapered roller bearing according to a first embodiment.
FIG. 1(b) is a sectional view taken along line Ib-Ib of FIG. 1(a).
Figure 2:
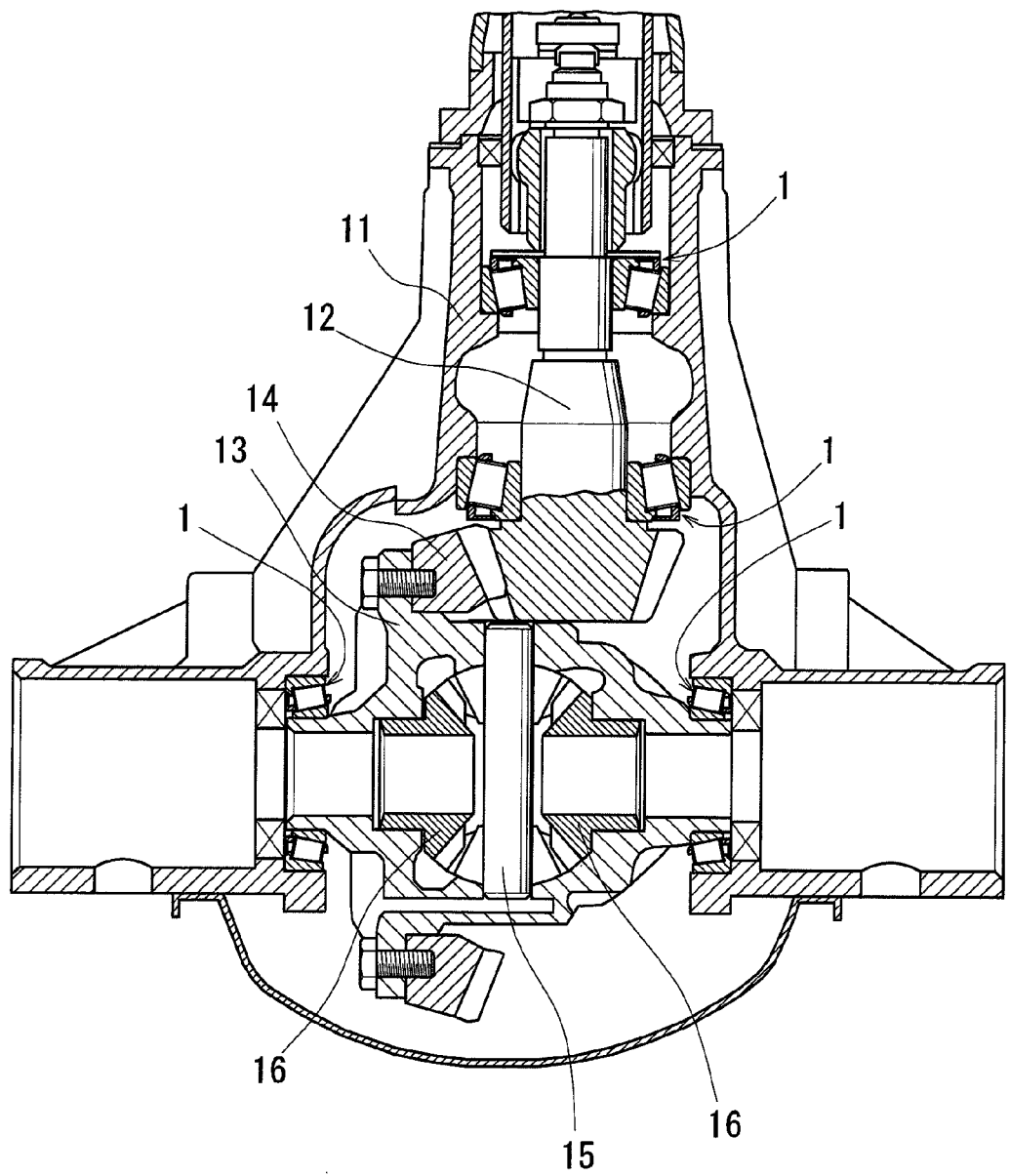
FIG. 2 is a transverse sectional view of a differential in which tapered roller bearings shown in FIG. 1 are used.

Now the embodiments of the present invention are described with reference to the drawings. FIGS. 1 to 3 show the first embodiment. As shown in FIGS. 1(a) and 1(b), the tapered roller bearing 1 of this embodiment includes an inner race 2 and an outer race 3 having conical raceways 2a and 3a, respectively, tapered rollers 4 disposed between the raceways 2a and 3a, and a conical tubular retainer 5 having pockets 5a in which the respective tapered rollers 4 are received. The inner race 2 has a flange 6 only at the large-diameter end of the raceway 2a for guiding the large end surfaces 4a of the tapered rollers 4. A protrusion 7 extends radially inwardly from the large-diameter end portion of the retainer 5 and is axially in engagement with a circumferentially continuous cutout groove 6a formed in the flange 6. This arrangement allows the small end surfaces 4b of the tapered rollers 4 to be located on the portion of the raceway 2a of the inner race 2 close to its small-diameter end surface.

The retainer 5 is made of polyphenylene sulfide resin (PPS) and contains not more than 10% by mass of carbon fibers as a reinforcing material. The retainer 5 is located nearer to the outer race 3 than is the pitch circle diameter PCD of the tapered rollers 4 so that the roller coefficient $\gamma$ is larger than 0.94. The pockets 5a have a window angle $\theta$ of not less than 55° or over and 80° or under.

The cutout groove 6a of the flange 6 is a concave arcuate surface having a radius of curvature $\rho$ and smoothly connecting the radially outer surface of the flange 6 to its outer end surface. The inner surface of the protrusion 7 at its free end which is in engagement with the cutout groove 6a is a convex arcuate surface 7a having a radius of curvature R that is slightly smaller than the radius of curvature $\rho$. In this embodiment, the protrusion 7 is a circumferentially continuous annular portion. But instead the protrusion 7 may comprise a plurality of circumferentially spaced apart portions.

FIG. 2 shows an automotive differential in which are used the above-described tapered roller bearings 1. This differential includes a drive pinion 12 coupled to a propeller shaft (not shown) and inserted through a differential case 11, a ring gear 14 mounted to a differential gear case 13 and meshing with the drive pinion 12, pinion gears 15 mounted in the differential gear case 13, and side gears 16 coupled to respective right and left drive shafts (not shown) inserted through the differential gear case 13 and meshing with the pinion gears 15. Thus, driving force from the engine is transmitted through the propeller shaft to the right and left drive shafts. In this differential, the drive pinion 12 as the power transmission shaft and the differential gear case 13 are supported by respective tapered roller bearings 1.

EXAMPLE

Figure 3A:
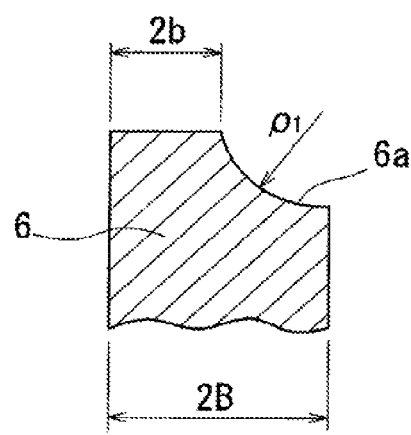
FIGS. 3(a) and 3(b) are schematic views of flange models used to calculate the stress concentration coefficients of an Example of the invention and a Comparative Example.
Figure 3B:
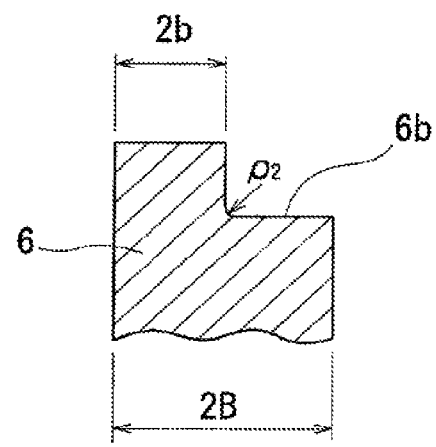

As an example of the invention, as shown in FIG. 3(a), a model was prepared in which the shape of the flange 6 of the inner race 2 was simplified such that it has a width 2B, and a tip width 2b except its cutout groove 6a, and the continuously concave-curved arcuate surface of the cutout groove 6a has a radius of curvature $\rho 1$. As a comparative example, as shown in FIG. 3(b), a model was prepared in which a circumferential step 6b was formed at the corner of the outer periphery and the end surface of the flange 6, the circumferential step 6b having a fillet portion having a radius of curvature $\rho 2$, and in which, as with the example of the invention, the flange 6 has a width 2B and a tip width 2b except the circumferential step 6b.

For the respective models according to the example of the invention and the comparative example, the stress concentration coefficients $\alpha$ at the central portion of the cutout groove 6a and at the fillet portion of the circumferential step 6b when a thrust load P is applied to the inner end surface of the flange 6 were calculated using the equation (1) under the following conditions.

2B=3.8 mm, 2b=1.9 mm, ρ1=1.5 mm, ρ2=0.3 mm

[Equation 1]

$$\alpha = 1 + \left\{ \tanh \left[ \frac{\left(\frac{B}{b}-1\right)^{1/4}}{1-\frac{\rho}{2b}} \right] \right\} \left\{ \frac{0.13 + 0.65\left(1-\frac{\rho}{2b}\right)^4}{\left(\frac{\rho}{2b}\right)^{1/3}} \right\} \quad (1)$$

For the model according to the comparative example, the stress concentration coefficients α was 1.65, while for the model according to the example of the invention, the stress concentration coefficients α was 1.3, which is about 30% lower than that for the model according to the comparative example.

Figure 4:
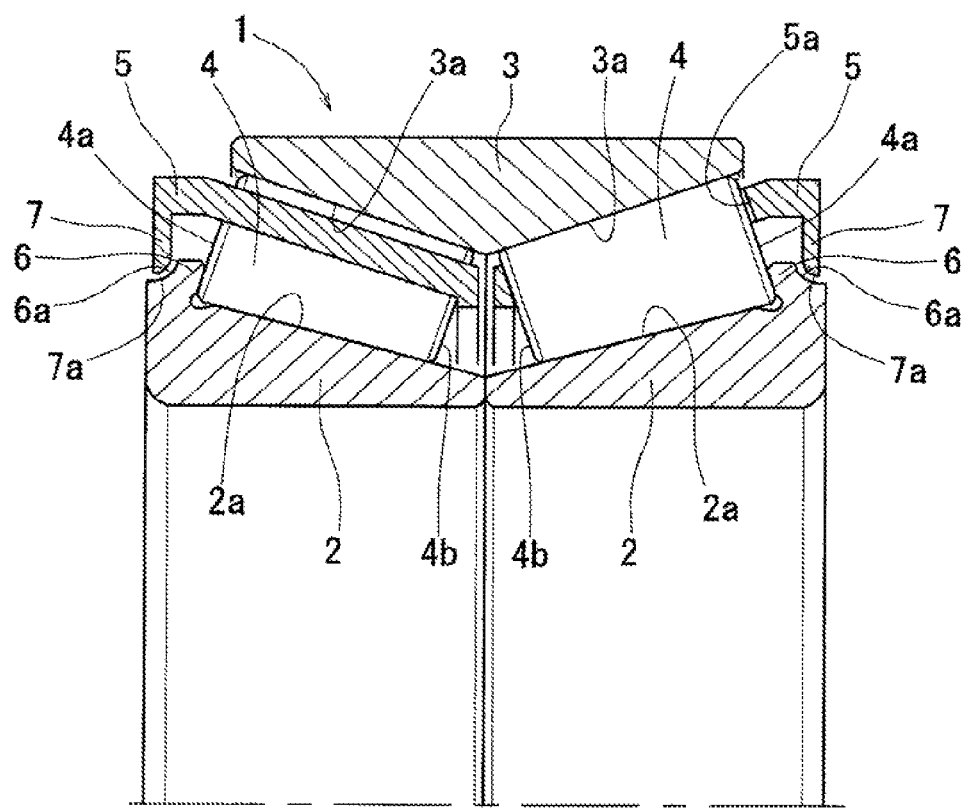
FIG. 4 is a vertical sectional view of a tapered roller bearing according to a second embodiment.

FIG. 4 shows the second embodiment. The tapered roller bearing of this embodiment is a double-row tapered roller bearing including an outer race 3 having two raceways 3a, two separate inner races 2 each having a raceway 2a, and tapered rollers 4 arranged in two rows with their large end faces 4a facing outwardly and retained by retainers 5. As with the first embodiment, each inner race 2 has a flange 6 only at its large-diameter end, which faces outward, and each retainer 5 has a protrusion 7 extending radially inwardly from its large-diameter end and axially in engagement with a circumferentially continuous cutout groove 6a formed in the flange 6. The small-diameter end surface of each retainer 5 and the outermost end of the small end surface 4b of each tapered roller 4 are located axially inwardly of the small-diameter end surface of raceway 2a of the corresponding inner race 2. The double row tapered roller bearing is thus compact in size and lightweight.

Each cutout groove 6a is a concave arcuate surface having a radius of curvature ρ. The inner surface of the protrusion 7 of each retainer 5 at its free end is a convex arcuate surface 7a having a radius of curvature R that is slightly smaller than the radius of curvature ρ. While not shown, this double row tapered roller bearing also has a roller coefficient γ larger than 0.94, and the window angle θ of the pockets 5a is 55° or over and 80° or under.

In the above embodiments, the cutout groove of the flange comprises a singe concave arcuate surface. But the cutout groove according to the present invention may comprise a plurality of concave arcuate surfaces instead.

Figure 5:
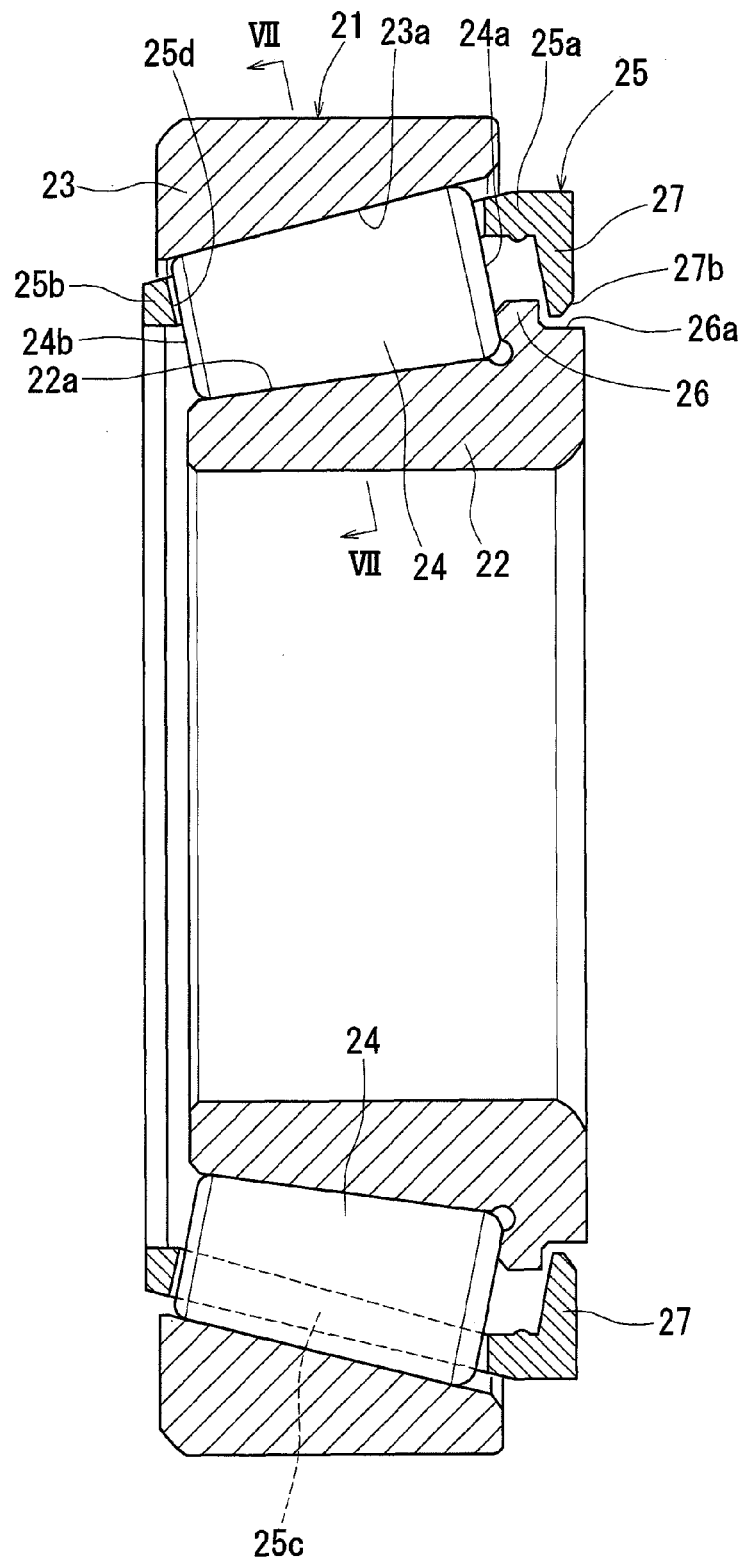
FIG. 5 is a vertical sectional view of a tapered roller bearing using a retainer manufactured in a first mode.

Now description is made of a method of manufacturing a retainer for a tapered roller bearing in which the retainer can be formed by injection molding of a resin without any restriction regarding designing of the bearing. FIG. 5 shows a tapered roller bearing 21 including a retainer 25 manufactured in the first mode. This tapered roller bearing 21 comprises an inner race 22 and an outer race 23 having conical raceways 22a and 23a, respectively, tapered rollers 24 disposed between the raceways 22a and 23a, a conical tubular retainer 25 retaining the tapered rollers 24. The inner race 22 has a flange 26 only at the large-diameter end of the raceway 22a to guide the large end surfaces 24a of the tapered rollers 24. The retainer 25 has protrusions 27 radially inwardly extending from its large-diameter end and axially in engagement with a circumferentially continuous cutout groove 26a formed in the flange 26.

The body of the retainer comprises a large-diameter annular portion 25a, a small-diameter annular portion 25b and a plurality of bridges 25c coupling the annular portions 25a and 25b together. The circumferentially adjacent bridges 25c define pockets 25d in which the respective tapered rollers 24 are rollably received.

Figure 6:
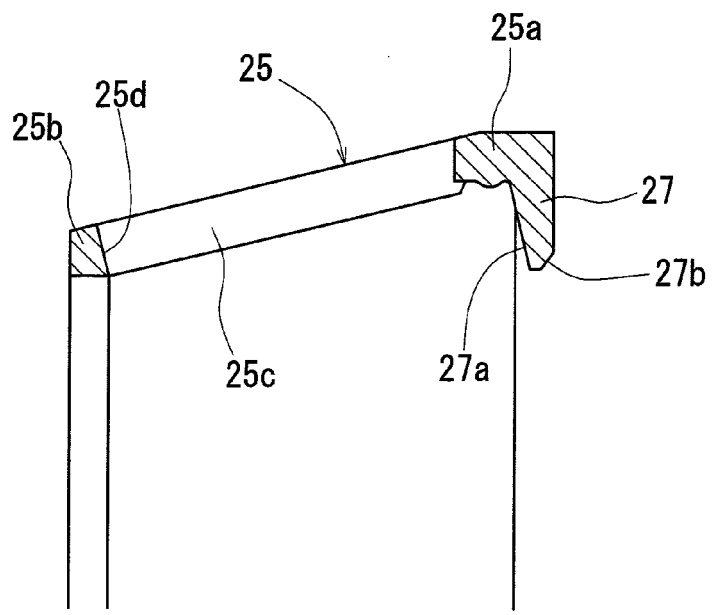
FIG. 6 is a vertical sectional view of the retainer of FIG. 5.

As shown in FIG. 6, the protrusions 27 partially extend from the circumferential positions where there are the pockets 25d and each has a tapered inner side surface 27a that extends obliquely radially inwardly and axially outwardly at the same inclination angle as that of the large and small end surfaces 24a and 24b of the tapered rollers 24. A cutout 27b is formed in the outer side surface of each protrusion 27 at its radially inner end.

Figure 7:
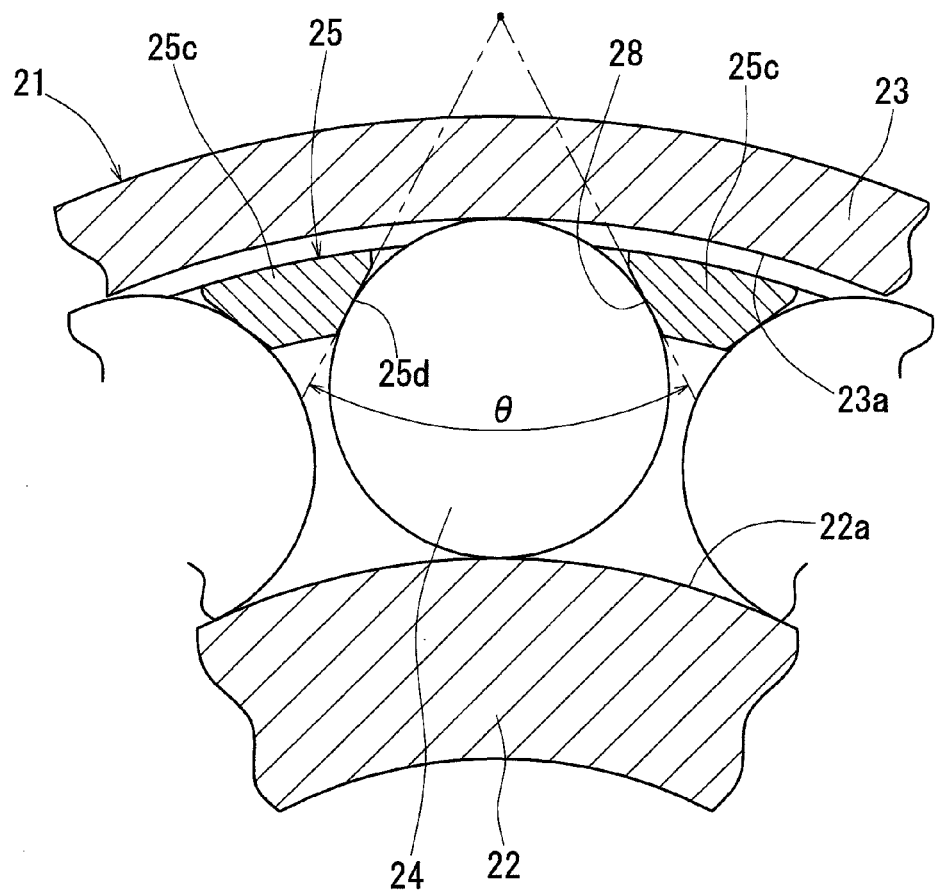
FIG. 7 is a sectional view taken along line VII-VII of FIG. 5.

As shown in FIG. 7, the window angle θ of each pocket 25d, which is formed by the opposed surfaces 28 of the bridges 25c of the retainer 25 is 55° or over and 80° or under. The roller coefficient γ is over 0.94.

The retainer 25 of the embodiment is made of polyphenylene sulfide resin (PPS), which is a super-engineering plastic. Among synthetic resins, engineering plastics are particularly superior in heat resistance and can be used for applications where high strength is required. Engineering plastics include general-purpose engineering plastics and super-engineering plastics. The retainer 25 may be made of either type of engineering plastic.

General-purpose plastics include polycarbonate (PC), polyamide 6 (PA6), polyamide 66 (PA66), polyacetal (POM), modified polyphenylene ether (m-PPE), polybutylene terephthalate (PBT), GF-reinforced polyethylene terephthalate (GF-PPT), and ultra-high molecular weight polyethylenes (UHMW-PE). Super-engineering plastics include, besides PPS, polysulfone (PSF), polyethersulfone (PES), polyallylate (PAR), polyamideimide (PAI), polyetherimide (PEI), polyetheretherketone (PEEK), liquid crystal polymers (LCP), thermoplastic polyimides (TPI), polybenzimidazole (PBI), polymethylbenzene (TPX), poly(1,4-cyclohexane-dimethylene terephthalate) (PCT), polyamide 46 (PA46), polyamide 6T (PA6T), polyamide 9T (PA9T), polyamide 11, 12 (PA11, 12), fluororesin, and polyphthalic acid (PPA).

Figure 8:
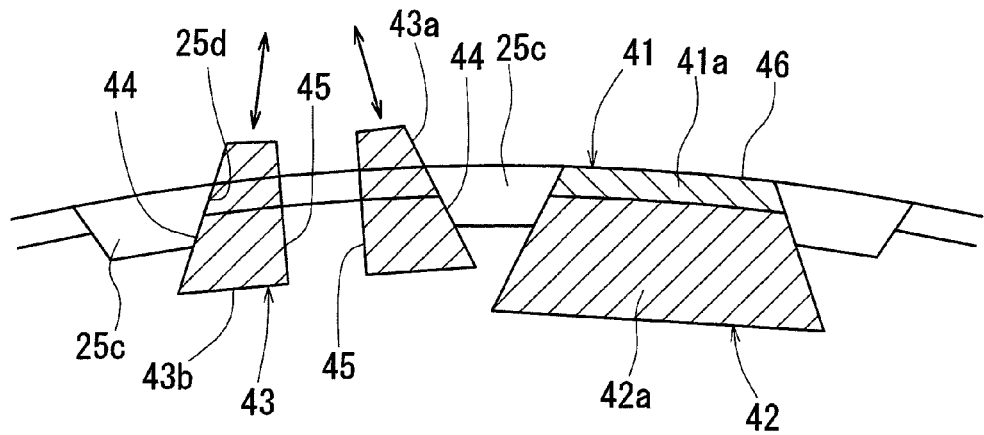
FIG. 8 is a schematic sectional view of a mold assembly used for manufacturing the retainer of FIG. 5.

Now, description is made of a mold assembly for manufacturing the retainer 25 by injection molding. As shown in FIG. 8, the mold assembly comprises a radially outer mold 41 (only its portion is shown) that defines the radially outer portion of the cavity into which resin for forming the conical tubular portion of the retainer 25 is injected, a radially inner mold 42 (only its portion is shown) that defines the radially inner portion of the cavity, and pocket forming cores 43 that close portions of the cavity corresponding to the pockets 25d. Each pocket forming core 43 comprises two separate halves 43a and 43b having a trapezoidal section. They are arranged at circumferential positions 27 of the pockets 25d where the protrusions 27 are formed.

The separate halves 43a and 43b each have an inclined side surface 44 and a radially extending radial side surface 45 and are arranged such that their radially side surfaces 45 face each other. Also, the separate halves 43a and 43b are moved radially inwardly into position and radially outwardly out of position along the surfaces 28 of the bridges 25c to be formed. Between the opposed radial side surfaces 45 of the separate halves 43a and 43b, a cavity is defined for forming the protrusion 27.

Each pocket 25d where no protrusion 27 is formed is formed by a core 46 comprising one of projections 41a of the radially outer mold 41 and one of projections 42a of the radially inner mold 42.

With the mold assembly shown in FIG. 8, since the pocket forming cores 43 can be moved radially into and out of the cavity, it is not necessary to axially slide the radially outer mold 41 and the radially inner mold 42. Thus it is possible to form the retainer 25 having the protrusions 27 by injection molding without any design restriction of the bearing, even if its small-diameter end surface has an outer diameter larger than the inner diameter of the radially inner end of the protrusion. The pocket forming cores 43 of the mold assembly shown in FIG. 8 are moved radially inwardly into the cavity and moved radially outwardly out of the cavity. But instead, they may be moved radially outwardly into the cavity and moved radially inwardly out of the cavity.

Figure 9:
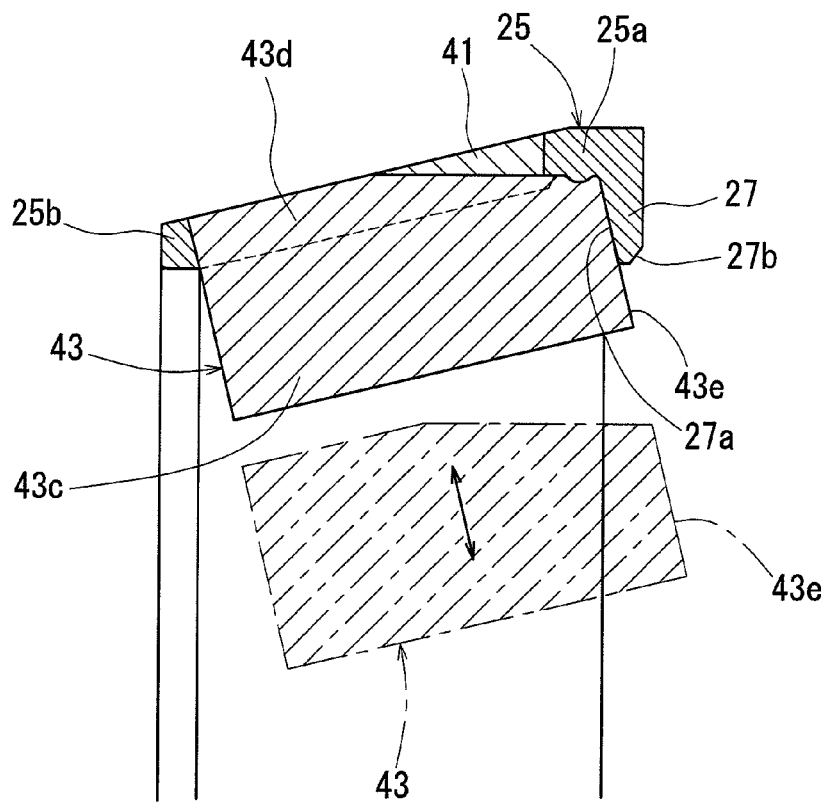
FIG. 9 is a schematic sectional view of a modification of the mold assembly of FIG. 8.

FIG. 9 shows a modified example of this mold assembly. In this modified example, each pocket forming core 43 comprises a core body 43c and a projection 43d integral with the core body 43c for forming a portion of the pocket 25d. The core body 43c has a surface 43e for forming the protrusion 27 extending along the inner tapered side surface 27a of the protrusion 27.

As shown by the arrow in FIG. 9, the pocket forming cores 43 of this modified example are moved into and out of the cavity from and toward the radially inner position in the direction perpendicular to the axial inclination angle of the cavity. Thus, the surface 43e of each pocket forming core 43 forms the tapered inner side surface 27a of the protrusion 27 such that the surface 27a has the same inclination angle as the large end surface 24a and the small end surface 24b of each tapered roller 24. In this modified example too, it is possible to form the retainer 25 having the protrusions 27 by injection molding without any design restriction of the bearing, and without axially sliding the radially outer mold 41 and the radially inner mold 42 (not shown).

Figure 10:
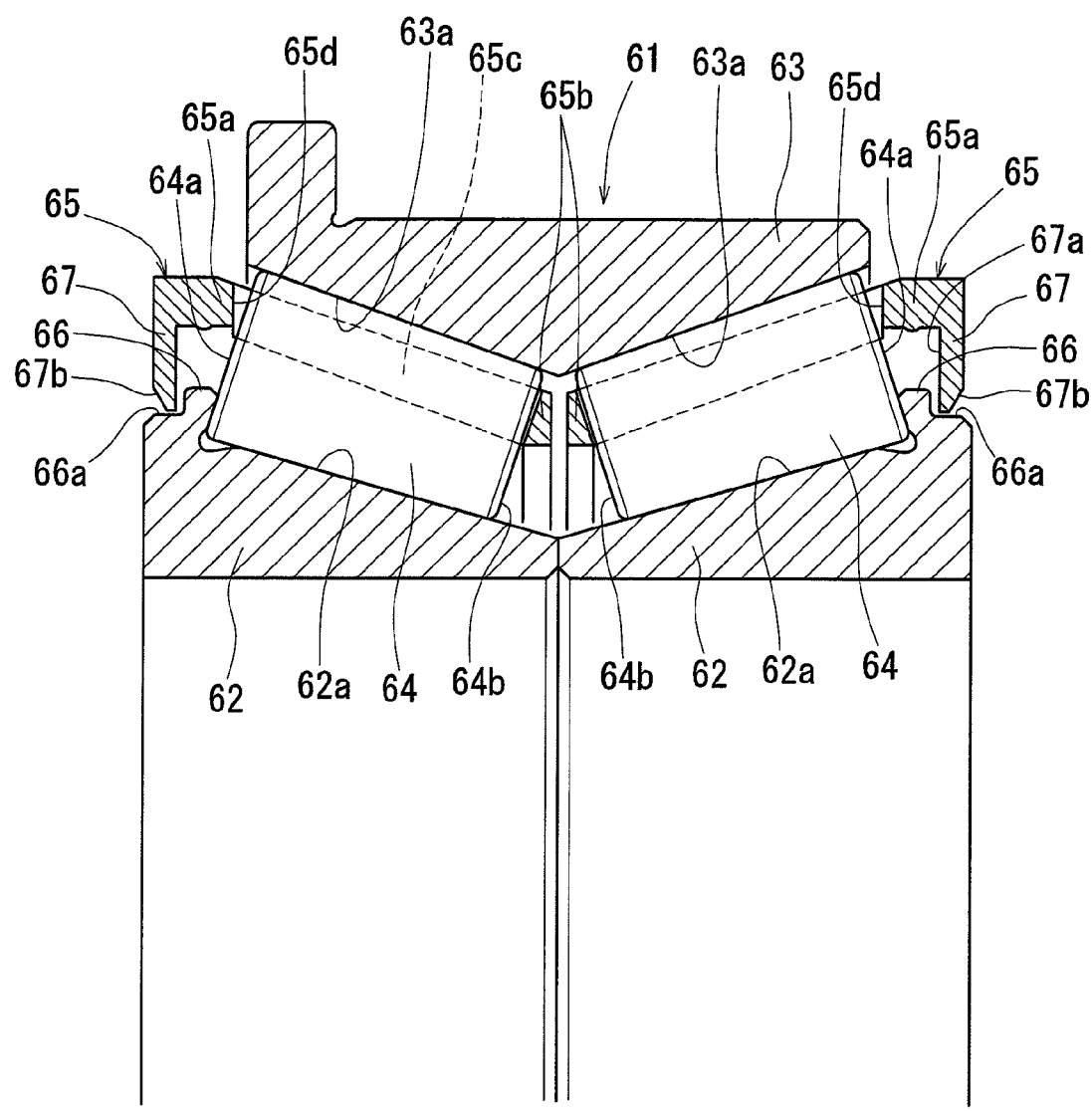
FIG. 10 is a vertical sectional view of a tapered roller bearing using retainers manufactured in a second mode.

FIG. 10 shows a double row tapered roller bearing 61 including retainers 65 manufactured in the second mode. This double row tapered roller bearing 61 comprises an outer race 63 having two raceways 63a, two separate inner races 62 each having a raceway 62a, and two rows of tapered rollers 64 retained by retainers with their large end surfaces 64a facing outwardly. Each inner race 62 has a flange 66 only on its large-diameter side, which faces outwardly. Each retainer 65 has radially inwardly extending protrusions 67 on its large-diameter side. Each flange 66 is formed with a circumferentially continuous cutout groove 66a which axially engages the protrusions 67. The small-diameter end surface of each retainer 65 and the outermost end of the small end surface 64b of each tapered roller 64 are located axially inwardly of the small-diameter end surface of the raceway 62a of the corresponding inner race 62. The double row tapered roller bearing is thus compact in size and lightweight.

As with the first mode, the body of each retainer 65 comprises a large-diameter annular portion 65a, a small-diameter annular portion 65b, and a plurality of bridges 65c coupling the annular portions 65a and 65b together. The tapered rollers 64 are rollably received in respective pockets 65d defined by the circumferentially adjacent bridges 65c. The protrusions 67 of the retainers 65 also partially extend from the circumferential positions where there are the pockets 65d and each has a tapered inner side surface 67a that extends perpendicular to the axial direction. The protrusions 67 each have a cutout 67b in its outer surface at its radially inner end. The retainers 65 are also made of PPS and their pockets 65d have a window angle θ of 55° or over and 80° or under. This bearing also has a roller coefficient γ exceeding 0.94.

Figure 11:
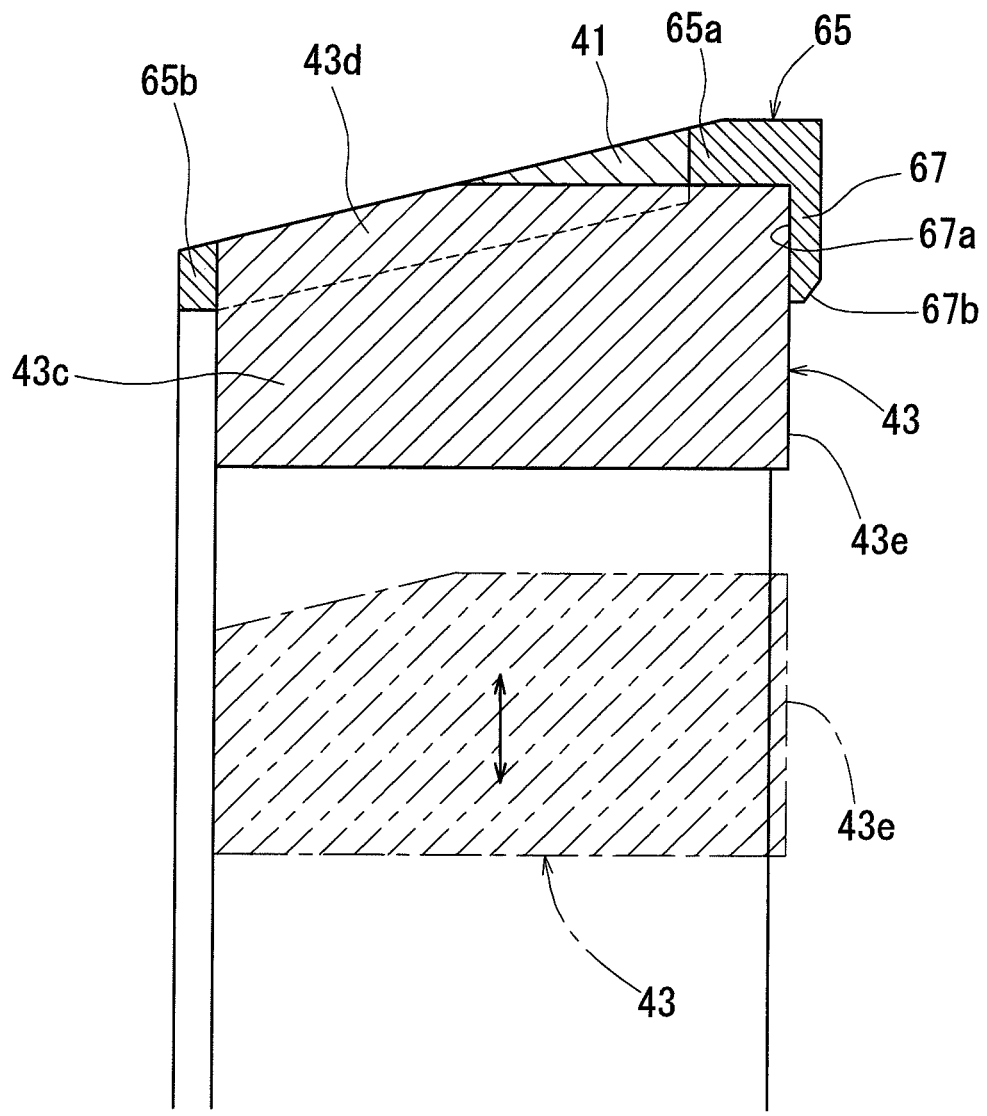
FIG. 11 is a schematic sectional view of a mold assembly used for manufacturing the retainer of FIG. 10.
Figure 12:
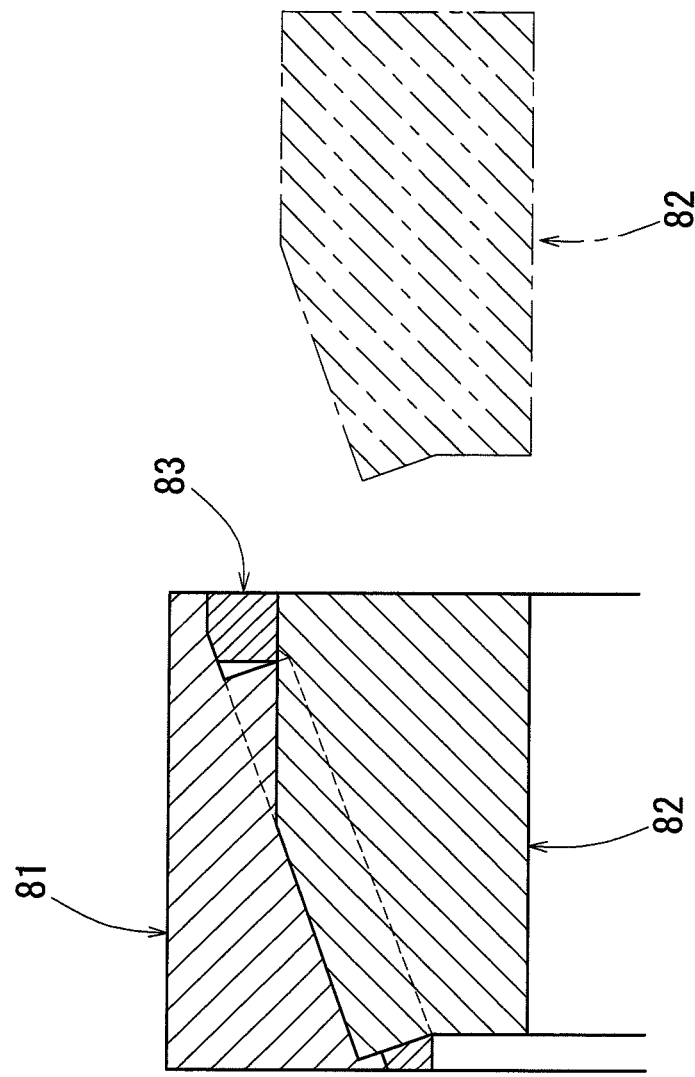
FIG. 12 is a schematic sectional view of a mold assembly used for manufacturing a retainer for a conventional tapered roller bearing.
Figure 13:
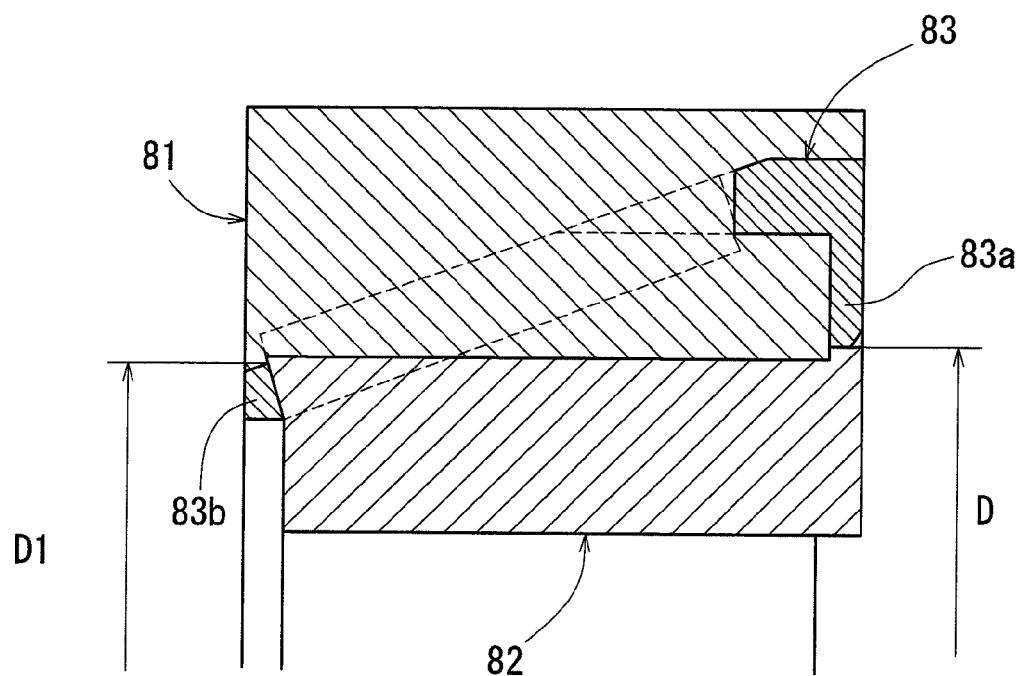
FIG. 13 is a schematic sectional view of a mold assembly used for manufacturing a retainer for another conventional tapered roller bearing.

FIG. 11 shows a mold assembly for forming the retainers 65 by injection molding. The pocket forming cores 43 of this mold assembly also each comprise, as with the one shown in FIG. 9, a core body 43c and a projection 43d integral with the core body 43c for forming a portion of the pocket 65d. The core body 43c has a surface 43e for forming the protrusion 67 that extends along the inner side surface 67a of the protrusion 67 extending perpendicular to the axial direction.

As shown by the arrow in FIG. 11, the pocket forming cores 43 are moved into and out of the cavity from and toward the radially inner position in the direction perpendicular to the axial direction. Thus, the surface 43e of each pocket forming core 43 forms the inner side surface 67a of the protrusion 67 such that the surface 67a is perpendicular to the axial direction. Thus, it is possible to form the retainer 65 having the protrusions 67 by injection molding without any design restriction of the bearing, and without axially sliding the radially outer mold 41 and the radially inner mold 42 (not shown).

By using any of the above-mentioned mold assemblies, it is possible to form protrusions at circumferential positions corresponding to any desired pockets. The retainer may have only one protrusion. But in order to reliably prevent separation of the tapered rollers from the inner race, three or more such protrusions are preferably formed at equal or unequal circumferential intervals.

What is claimed is:

1. A tapered roller bearing comprising:
   an inner race having a conical inner raceway with a large-diameter axial end and a small-diameter axial end;
   an outer race having a conical outer raceway with a large-diameter axial end and a small-diameter axial end;
   tapered rollers, each having a large-diameter axial end and a small-diameter axial end, disposed between the inner and outer races; and
   a conical tubular retainer having pockets in which the tapered rollers are retained, respectively, the conical tubular retainer having a large-diameter axial end and a small-diameter axial end;
   wherein said inner race has a flange for guiding the tapered rollers only at the large-diameter axial end of the inner raceway, the flange having a radially outer surface and an axial outer end surface;
   wherein said retainer has, on the large-diameter axial end thereof, a protrusion radially inwardly extending and axially engaging the flange of the inner race;
   wherein the flange of the inner race is formed with a circumferentially continuous cutout groove having a curved concave surface through which the radially outer surface and the axially outer end surface of the flange are connected to each other;
   wherein the curved concave surface of the cutout groove is a continuously curved surface that is continuously curved from the radially outer surface to the axially outer end surface of the flange;
   wherein the protrusion of the retainer has, at a radially inner end portion thereof, an axially inner side in engagement with the curved concave surface of the cutout groove;
   wherein the curved surface of the cutout groove is a continuously concave-curved surface that is continuously concave-curved from the radially outer surface to the axially outer end surface of the flange; and
   wherein the continuously concave-curved surface is continuously concave-curved at a single radius of curvature.

2. The tapered roller bearing of claim 1 wherein the axially inner side of the protrusion of the retainer at the radially end portion thereof is a convex arcuate surface.

3. The tapered roller bearing of claim 2 wherein said convex arcuate surface has a radius of curvature equal to or smaller than a radius of curvature of the concave surface of the cutout groove.

4. The tapered roller bearing of claim 1 wherein the small-diameter axial end of the retainer and the small-diameter axial end of each tapered roller are located axially inwardly of the small-diameter axial end of the inner race.

5. The tapered roller bearing of claim 1 wherein said retainer is made of polyphenylene sulfide resin.

6. The tapered roller bearing of claim 5 wherein not more than 10% by mass of reinforcing material is added to the polyphenylene sulfide resin forming the retainer.

7. The tapered roller bearing of claim 1 having a roller coefficient γ exceeding 0.94.

8. The tapered roller bearing of claim 1 wherein the pockets of the retainer have a window angle of 55° or over and 80° or under.

9. The tapered roller bearing of claim 1 which supports a power transmission shaft of a vehicle.

\* \* \* \* \*